US012592878B2

(12) United States Patent
Lo et al.

(10) Patent No.: US 12,592,878 B2
(45) Date of Patent: Mar. 31, 2026

(54) NEGOTIATION OF UMR ROLES TO ALLOW SUPPORT OF UMR AWARE AND NON-AWARE NODES AND ASSOCIATED FORWARDING BEHAVIOR WITHIN A SINGLE EVPN DOMAIN

(71) Applicant: Arista Networks, Inc., Santa Clara, CA (US)

(72) Inventors: Alton Lo, Freemont, CA (US); Alex Nichol, Henley-on-Thames (GB)

(73) Assignee: Arista Networks, Inc., Santa Clara, CA (US)

( * ) Notice: Subject to any disclaimer, the term of this patent is extended or adjusted under 35 U.S.C. 154(b) by 37 days.

(21) Appl. No.: 18/493,632

(22) Filed: Oct. 24, 2023

(65) Prior Publication Data

US 2025/0133004 A1 Apr. 24, 2025

(51) Int. Cl.
*H04L 45/03* (2022.01)
*H04L 45/00* (2022.01)
*H04L 45/02* (2022.01)

(52) U.S. Cl.
CPC .............. *H04L 45/03* (2022.05); *H04L 45/04* (2013.01); *H04L 45/66* (2013.01)

(58) Field of Classification Search
None
See application file for complete search history.

(56) References Cited

U.S. PATENT DOCUMENTS

| | | | | |
|---|---|---|---|---|
| 6,556,541 B1* | 4/2003 | Bare | ...................... | H04L 45/02 |
| | | | | 370/396 |
| 10,291,532 B1* | 5/2019 | Tiruveedhula | ........ | H04L 47/125 |
| 11,743,229 B2* | 8/2023 | Ranpise | .............. | H04L 12/4633 |
| | | | | 709/245 |
| 11,895,006 B2* | 2/2024 | Liu | ...................... | H04L 45/033 |
| 2021/0021509 A1* | 1/2021 | Sajassi | ................ | H04L 12/4641 |
| 2022/0078046 A1* | 3/2022 | Wang | ...................... | H04L 45/74 |
| 2024/0314060 A1* | 9/2024 | Ananthamurthy | ...... | H04L 45/66 |
| 2025/0193046 A1* | 6/2025 | Fu | ........................... | H04L 12/66 |

OTHER PUBLICATIONS

European Search Report for European Patent Application No. 24207169.4, dated Feb. 19, 2025, 11 pgs.
(Continued)

*Primary Examiner* — Mohamed Ibrahim
(74) *Attorney, Agent, or Firm* — Sprinkle IP Law Group

(57) ABSTRACT

A UMR auto-discovery mechanism which allows a gateway EVPN router to advertise a UMR route and to suppress redistribution of remote domain MAC-IP routes. In one embodiment, upon joining a local EVPN domain of a network, a network device (an EVPN router) advertises its UMR capability, which may include UMR installer capability or UMR originator capability. The UMR-capable devices in the network are also advertised to the newly added network device. A UMR originator (e.g., gateway) with knowledge of the UMR capabilities of the devices in the network then generates and sends a route list to the devices, where the route list includes a UMR route, or MAC/IP routes, or both, depending upon whether all of the network devices are all UMR-capable, none are UMR-capable, or the devices include both UMR-capable and non-UMR-capable devices, respectively.

20 Claims, 5 Drawing Sheets

(56) References Cited

OTHER PUBLICATIONS

Sajassi, A.: "Rfc 7432—BGP MPLS-Based Ethernet VPN", Feb. 2, 2015, 56 pgs. (XP055303848, retrieved at https://tools.ietf.org/html/rfc7432).

Rabadan J et al: "RFC 9014 Interconnect Solution for Ethernet VPN (EVPN) Overlay Networks", Internet Engineering Task Force (IETF), RFC: 9014, May 26, 2021 (May 26, 2021), pp. 1-24. (XP093140069, retrieved at https://www.rfc-editor.org/rfc/rfc9014.pdf).

Sajassi A. et al.: "Mobility Procedures in Presence of Unknown MAC Route", Rnet-Draft: Bess Working Group, Internet Engineering Task, No. 1, Mar. 13, 2023 (Mar. 13, 2023), pp. 1-14. (XP015158800, retrieved at https://tools.ietf.org/html/draft-sajassi-bess-evpn-umr-mobility-01).

Patel K.: "Virtual Hub-and-Spoke in BGP EVPNs", Internet Society 4, Sep. 28, 2019, pp. 1-17. (XP015137474, retrieved at https://tools.ietf.org/html/draft-ietf-bess-evpn-virtual-hub-00).

* cited by examiner

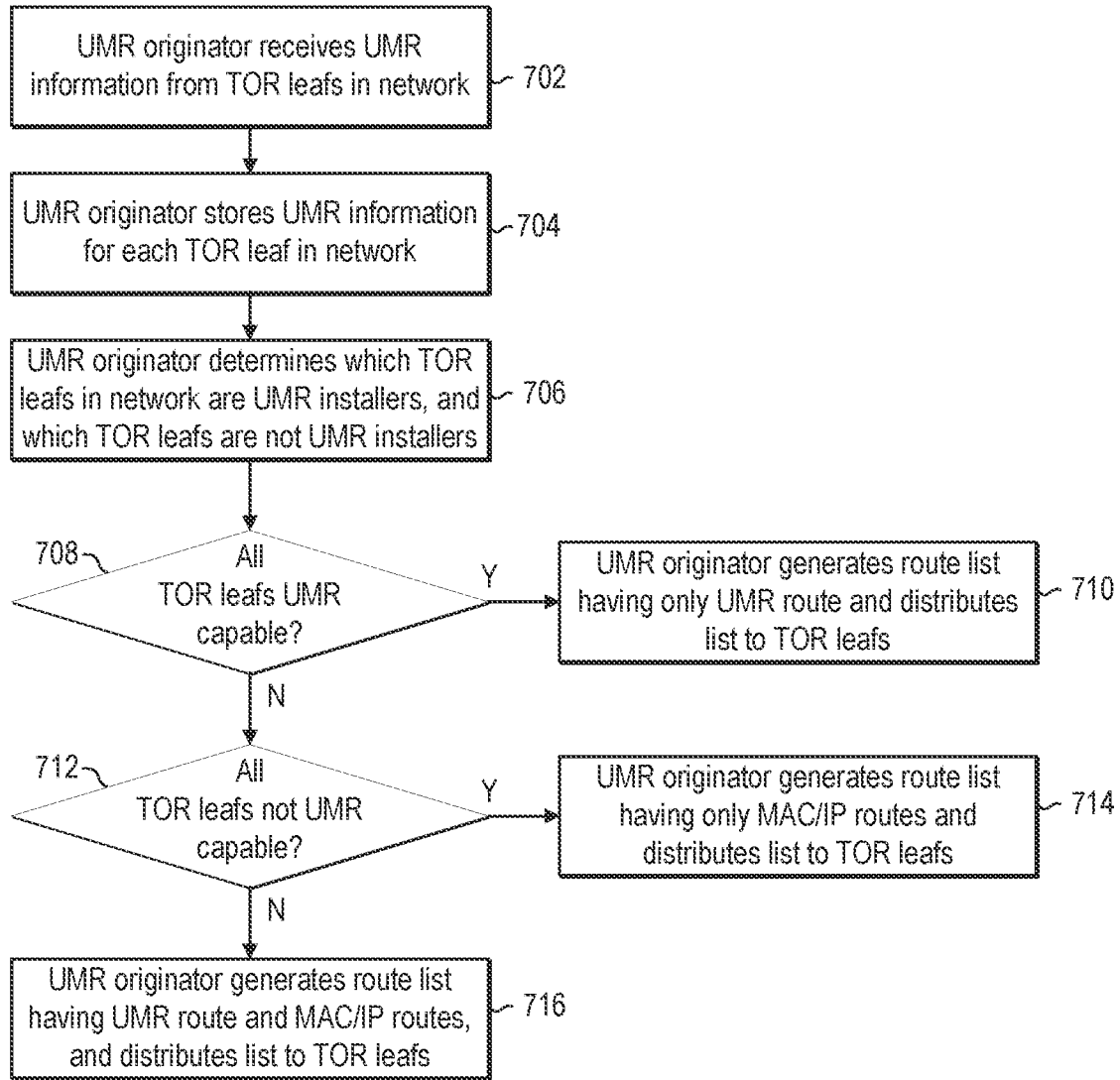

UMR originator receives UMR information from TOR leafs in network — 702

UMR originator stores UMR information for each TOR leaf in network — 704

UMR originator determines which TOR leafs in network are UMR installers, and which TOR leafs are not UMR installers — 706

708 — All TOR leafs UMR capable?

Y → UMR originator generates route list having only UMR route and distributes list to TOR leafs — 710

N

712 — All TOR leafs not UMR capable?

Y → UMR originator generates route list having only MAC/IP routes and distributes list to TOR leafs — 714

N

UMR originator generates route list having UMR route and MAC/IP routes, and distributes list to TOR leafs — 716

FIG. 7

NEGOTIATION OF UMR ROLES TO ALLOW SUPPORT OF UMR AWARE AND NON-AWARE NODES AND ASSOCIATED FORWARDING BEHAVIOR WITHIN A SINGLE EVPN DOMAIN

TECHNICAL FIELD

The disclosed embodiments relate generally to network devices, and more particularly to systems and methods for automatically discovering UMR capabilities of devices in the network and distributing route lists that are appropriate to the discovered UMR capabilities.

BACKGROUND

The use of an Ethernet Virtual Private Network (EVPN) in a Network Virtualization Overlay (NVO) network provides a number of benefits, such as Network Virtualization Edge (NVE) device auto-discovery, tenant MAC/IP dissemination and advanced features required by NVO networks. If multiple Data Centers (DCs) are interconnected into a single EVPN Instance (EVI), each data center will have to import all of the Media Access Control (MAC) addresses from each of the other DCs. Even if optimized Border Gateway Protocol (BGP) techniques like Route Target (RT) constraint are used, the number of MAC addresses to advertise or withdraw (in case of failure) by the Gateways (GWs) of a given DC could overwhelm the NVEs within that DC.

This problem can be addressed by the use of Unknown MAC Routes (UMRs). Standard RFC9014 of the Internet Engineering Task Force (IETF) defines the use of UMRs. UMRs are used as a mechanism to improve the EVPN MAC scaling by having the data center interface (DCI) gateway use the UMR route while suppressing "redistribution" of specific remote domain MAC+IP routes.

A UMR is advertised into a given DC by each of the gateways to the DC. The UMR route is a regular EVPN MAC/IP Advertisement route in which the MAC Address Length is set to 48, the MAC address is set to 0, and the Ethernet Segment Identifier (ESI) field is set to the DC gateway's Interconnect ESI (I-ESI). All the TOR (top-of rack) leafs therefore install the UMR route instead of specific remote domain MAC+IP routes. A UMR-capable TOR-leaf within the DC into which the UMR is advertised understands and processes the UMR, and will send unknown unicast frames to one of the DC's gateways. The gateways will then forward that packet to the correct egress Provider Edge (PE).

The existing UMR mechanism, however, has several problems. One of the problems is that it requires all the EVPN routers (TOR-leafs and DCI Gateways) to support the EVPN UMR mechanism. If one of the EVPN routers does not support the UMR mechanism, then the gateway must distribute the specific remote domain MAC+IP routes to all of the EVPN routers instead of the UMR route, so the scaling advantage of the UMR mechanism is lost. Another problem is that the existing UMR mechanism does not provide any auto-discovery mechanism, so the network operator cannot tell whether or not all of the EVPN routers are capable of supporting UMR.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 7 is a flow diagram illustrating a method implemented by a UMR originator such as a gateway in accordance with some embodiments.

DETAILED DESCRIPTION

Figure 1:
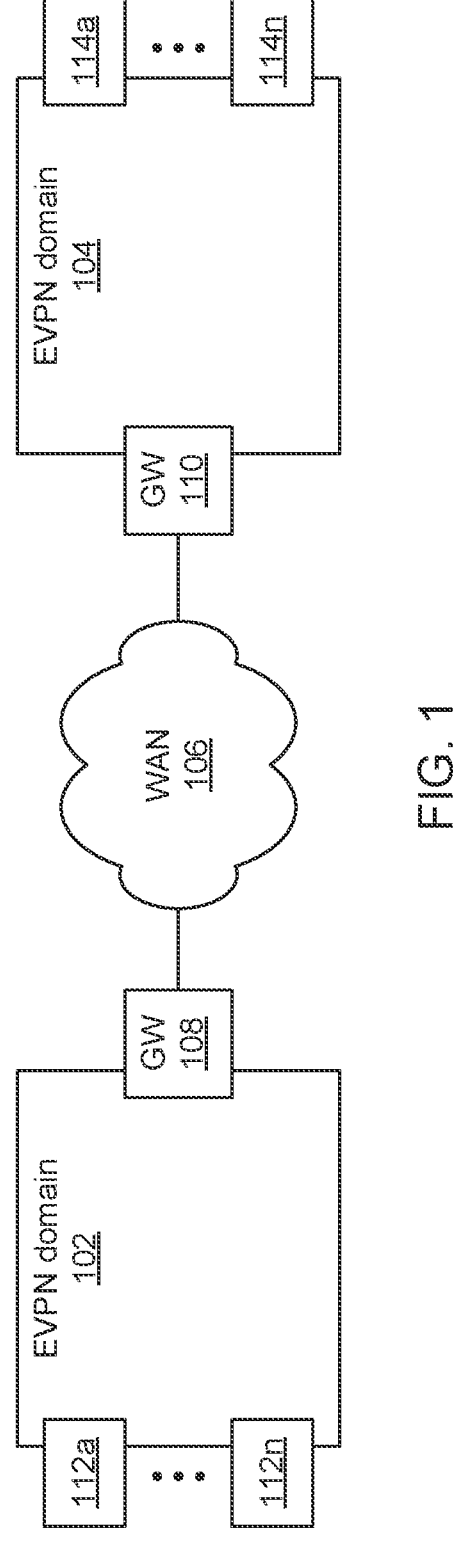
FIG. 1 is a block diagram which is shown to illustrate the connection of EVPN domains to a Wide Area Network in order to extend Layer 2 connectivity in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

The disclosed embodiments provide an UMR auto-discovery mechanism which allows a gateway EVPN router to advertise a UMR route and to suppress redistribution of remote domain MAC-IP routes. Using this mechanism, upon joining a local EVPN domain of a network, a network device (an EVPN router) advertises its UMR capability for each bridge-domain in which it is an active member, which may include UMR installer capability or UMR originator capability. The UMR-capable devices in the network are also advertised to the newly added network device. If the added network device is a UMR installer, it can receive UMR routes, but it cannot originate them, so it does not need to take further action with respect to the UMR mechanism. If the newly added network device is a UMR originator, it advertises this capability and also receives a notification of the other UMR-capable devices in the local EVPN domain so that it can originate a UMR route to these devices.

In addition to this UMR auto-discovery mechanism, the disclosed embodiments implement a unique route distribution mechanism. This mechanism accounts for the three possible scenarios: all of the network devices in the local EVPN domain are UMR-capable; none of the network devices in the local EVPN domain are UMR-capable (they are legacy devices); or some of the network devices in the local EVPN domain are UMR-capable while others are not (i.e., they are legacy devices). In conventional UMR mechanisms, if a single network device is not UMR-capable, UMR routes are not used, and the benefits of the UMR mechanism are not obtained. In the disclosed embodiments, if the network includes both UMR-capable devices and legacy devices, UMR originators distribute both legacy MAC-IP routes for remote EVPN domains and the UMR route. While legacy devices use the legacy routes, UMR-capable devices use the UMR route and therefore still derive a benefit of the UMR mechanism even though there are legacy devices in the local EVPN domain.

RFC 9014 defines the use of UMR route exchange for EVPN routers-data center interface gateways and data center leafs (TOR switches). The data center gateways and leafs may be referred to herein as EVPN routers, EVPN speakers, or simply nodes in the local EVPN domain. The UMR route exchange can be used as a means to relieve MAC scale issues that arise in an inter-data-center sketched Layer2 Domain. When UMR routes can be used, the gateway can distribute a single UMR route for nodes in a remote EVPN domain and suppress distribution of individual MAC/IP routes for each of the EVPN speakers in the remote EVPN domain. This reduces the processing burden on the gateway and allows greater scaling of the EVPN.

As noted above, the use of UMR routes requires that all the EVPN routers in the local EVPN domain be upgraded to support this functionality. For example, if one of the leafs does not support UMR, the gateway distributes a route list with all of the MAC/IP routes from the remote EVPN domain to the EVPN routers of the local EVPN domain. Additionally, the gateway should not advertise the UMR route into its local EVPN domain for a given L2 segment.

Thus, the existing UMR scheme does not allow legacy EVPN routers that do not support EVPN UMR to co-exist in a local EVPN domain with EVPN routers that do support EVPN UMR. The disclosed embodiments address this problem by specifying a new EVPN extension which defines the UMR roles of the EVPN routers of a given local EVPN domain (e.g., Bridge Domain or L2 segment). The disclosed embodiments further enable a gateway to discover if it can apply the UMR mechanism by having the EVPN routers exchange UMR role information. The disclosed embodiments further provide a solution to aid in deploying UMR with legacy EVPN routers.

There are two UMR roles. For a given EVPN domain, an EVPN router can have one of these two roles. The first UMR role is that of UMR originator, which includes gateways. Only the gateway should be an UMR originator since only the UMR originator sends the UMR advertisement with its UMR route. The UMR originator should ignore any UMR route advertised from another UMR originator. The second role is that of UMR installer, which includes TOR-leafs. A UMR installer is capable of supporting UMR mechanisms where the leaf routers forward all the "unknown unicast" L2 traffic towards the UMR originators.

The disclosed embodiments provide a new EVPN Extended Community for UMR roles. An EVPN router specifies its UMR role in an advertisement of a corresponding route for a given EVPN domain. The advertisement of nodes' roles within each EVPN domain ensures consistent forwarding behavior for all nodes sharing the EVPN domain. The specific format for the advertisement of nodes' roles will be discussed in more detail below.

Referring to FIG. 1, a diagram is provided to illustrate the connection of EVPN domains (network virtualization domains) to a Wide Area Network (WAN) in order to extend the Layer 2 connectivity in accordance with some embodiments. As depicted in this figure, in an EVPN, a first EVPN domain 102 is connected to a second EVPN domain 104 through a wide area network 106. Although only two EVPN domains are depicted in the figure, there may be additional EVPN domains, and in fact the disclosed embodiments facilitate the scaling of the system to include these additional EVPN domains. Communications from EVPN routers (e.g., 112) in one EVPN domain (e.g., 102) to EVPN routers (e.g., 114) in another EVPN domain (e.g., 104) are routed through the respective gateways (108, 110) of the EVPN domains.

It should be noted that different instances of the same or similar devices may be identified herein by a common reference number followed by a letter. For instance, as depicted in FIG. 1, this system includes EVPN routers $112a$-$112n$. The individual devices may be referred to by the number and letter (e.g., $112a$), or they may be referred to generically or collectively by the number alone (e.g., EVPN routers 112).

In order for one of the EVPN routers in a local EVPN domain to send a message to one of the EVPN routers in a remote EVPN domain, the source EVPN router must have a route to the destination EVPN router. The gateway of the source EVPN domain provides these routes to each of the EVPN routers in the source EVPN domain. For destination EVPN routers in a different EVPN domain from the source EVPN router, the gateway may provide the MAC/IP addresses for all of the destination EVPN routers, a UMR route, or both, depending upon the UMR capabilities of the EVPN routers in the local EVPN domain.

Figure 2:
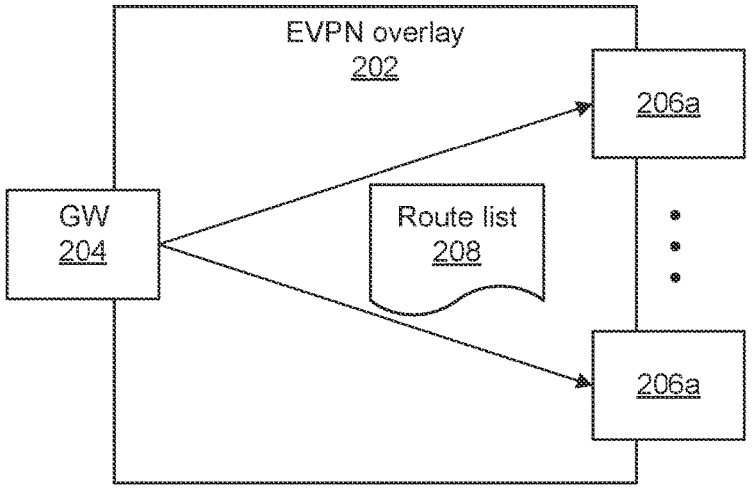
FIG. 2 is a diagram which is shown to illustrate the communication of remote domain route lists to a set of EVPN routers in a local EVPN domain in accordance with some embodiments.

Referring to FIG. 2, a diagram is provided to illustrate the communication of remote domain route lists to a set of EVPN routers in accordance with some embodiments. As depicted in this figure, a local EVPN domain 202 has a gateway 204 and a set of EVPN routers 206. The gateway generates a remote domain route list 208 that includes routes to each of the potential destination EVPN routers in the remote EVPN domains that are in the network and are accessible via gateway 204. Gateway 204 transmits the generated route list to each of the EVPN routers in local EVPN domain 202. EVPN routers 206 can then use the routes in route list 208 to send messages to destination EVPN routers in the remote EVPN domains.

Figures 3A, 3B, 3C:
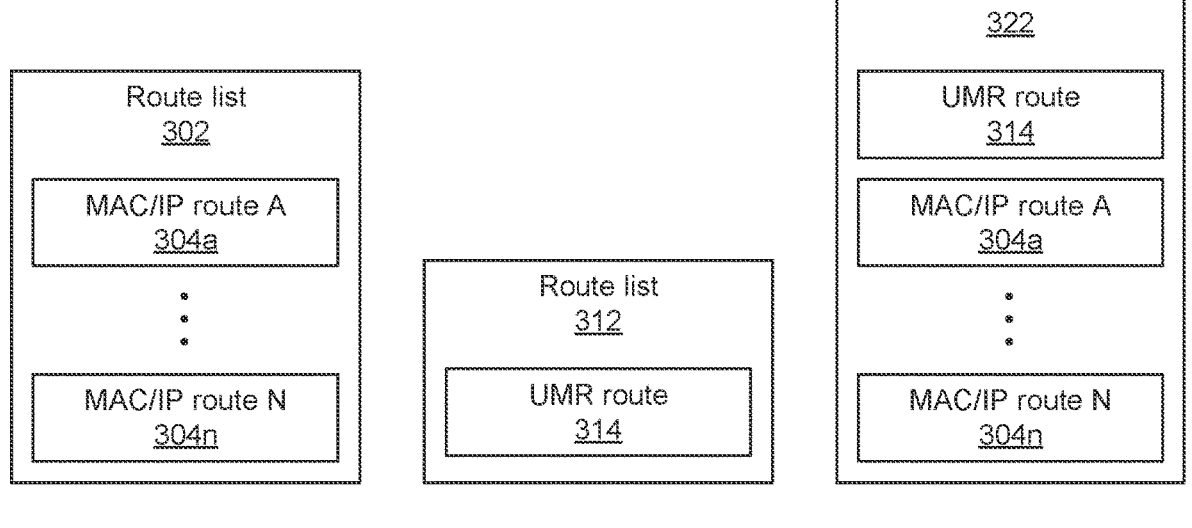
FIGS. 3A-3C are a set of diagrams provided to illustrate the content of the remote domain route list in accordance with some embodiments.

Referring to FIGS. 3A-3C, a set of diagrams are provided to illustrate the content of the remote domain route list in accordance with some embodiments. FIG. 3A depicts the content of the remote domain route list in the event that none of the EVPN routers in the remote EVPN domains are UMR-capable. FIG. 3B depicts the content of the remote domain route list in the event that all of the EVPN routers in the remote EVPN domains are UMR-capable. FIG. 3C depicts the content of the remote domain route list in the event that the EVPN routers in the remote EVPN domains comprise a mix of both UMR-capable and non-UMR-capable EVPN routers.

Referring to FIG. 3A, remote domain route list 302 contains a set of MAC/IP addresses 304. Each MAC/IP address corresponds to a particular destination EVPN router in a remote EVPN domain. As noted above, this figure depicts the content of the route list in the event that none of the EVPN routers in the local EVPN domain are UMR-capable. Since none of the EVPN routers in the local EVPN domain are UMR-capable, the route list does not include a UMR route. The devices in the local EVPN domain therefore use the specific MAC/IP addresses of the individual EVPN routers to send messages to the EVPN routers in the remote EVPN domains.

Referring to FIG. 3B, remote domain route list 312 contains only a UMR route 314. Because all of the EVPN routers in the local EVPN domain are UMR-capable, they can install a UMR route and there is no need to provide MAC/IP addresses for the remote domain EVPN routers. Consequently, no MAC/IP routes are included in list 312. The network devices in the local EVPN domain therefore use the UMR route to communicate with the EVPN routers in the remote EVPN domains.

Referring to FIG. 3C, remote domain route list 322 is generated by the gateway in a scenario in which the network includes both EVPN routers that are UMR-capable and EVPN routers that are not capable of using UMR routes. As noted above, this is a scenario that is not accommodated by existing systems that implement UMR routes. In the disclosed embodiments, when the network includes both UMR-capable and non-UMR-capable EVPN routers, the route list that is generated and distributed by the gateway includes both the UMR route 324 and the MAC/IP routes for each of the EVPN routers in the remote EVPN domain. The network devices then use UMR route 324 if they are UMR-capable or use the specific MAC/IP routes if they are not UMR-capable.

Before the gateway can generate the appropriate remote domain route list, it must be able to determine the UMR capabilities of the respective devices in the local EVPN domain. A high level method for identifying the devices' UMR capabilities and providing the appropriate route lists to the devices is illustrated in the flow diagram of FIG. 4.

Figure 4:
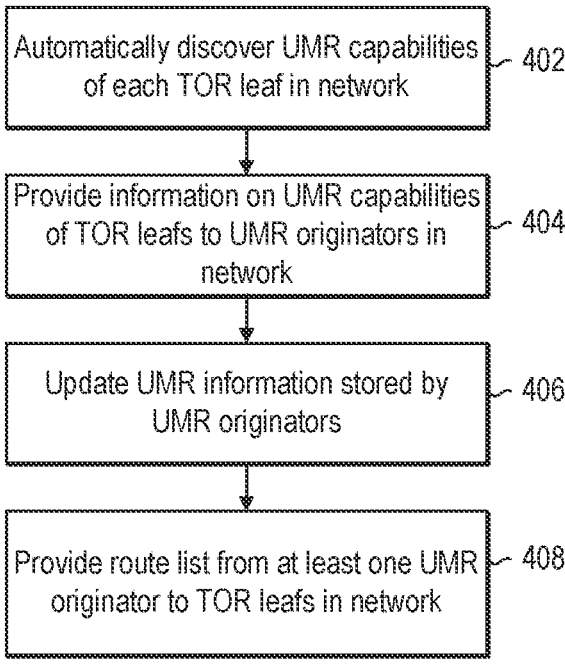
FIG. 4 is a flow diagram illustrating a high level method for identifying devices' UMR capabilities and providing the appropriate route lists to the devices in accordance with some embodiments.

Referring to FIG. 4, the method begins with the automatic discovery by a UMR originator (e.g. a gateway) of the UMR capability of each EVPN router as the device joins the local EVPN domain (step 402). In some embodiments, this involves receiving UMR information advertised by the joining device as part of the process of joining the network.

At step 404, the UMR originator updates information maintained by this device as to the UMR capabilities of the devices in the local EVPN domain. The update includes the UMR capability of the EVPN router that has just joined the network. The update is added to the information on the UMR capabilities of all of the EVPN routers that previously joined the local EVPN domain.

At step 406, after the UMR originators have updated their stored information relating to the UMR capabilities of the EVPN routers, at least one of the UMR originator devices generates a remote domain route list based on the UMR capabilities of the EVPN routers in the local EVPN domain. As noted above, if none of the EVPN routers in the local EVPN domain are UMR installers, the UMR originator generates a list containing only MAC/IP routes (e.g., as shown in FIG. 3A). If all of the EVPN routers in the local EVPN domain are UMR installers, the UMR originator generates a list containing only the UMR route (e.g., as shown in FIG. 3B). If some of the EVPN routers in the local EVPN domain are UMR installers while others are not UMR installers, the UMR originator generates a list containing both MAC/IP routes for all of the devices and a UMR route (e.g., as shown in FIG. 3C).

At step 408, the UMR originator sends the generated route list to the EVPN routers in the local EVPN domain, which may include EVPN routers that have UMR installer capability, EVPN routers that do not have UMR installer capability, or a combination of UMR-installer-capable EVPN routers and non-UMR-installer-capable EVPN routers. The EVPN routers can then use the UMR routes or non-UMR routes in the distributed route list according to their respective capabilities.

Figure 5:
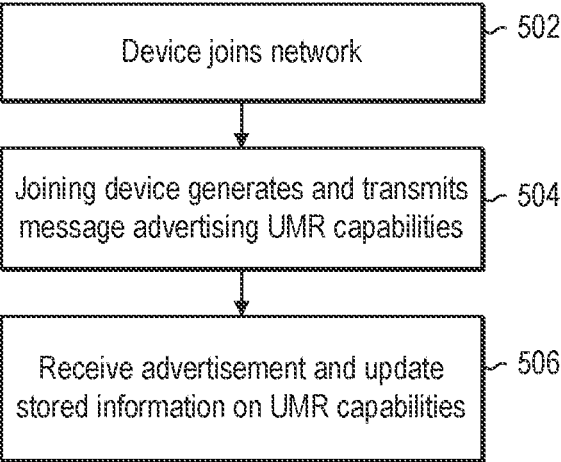
FIG. 5 is a flow diagram illustrating a method for automatically discovering the UMR capabilities of EVPN routers upon joining a local EVPN domain in accordance with some embodiments.

Referring to FIG. 5, a flow diagram is provided to illustrate a method for automatically discovering the UMR capabilities of EVPN routers upon joining a local EVPN domain in accordance with some embodiments. At step 502, a device joins a network.

At step 504, the joining device advertises its UMR capability (if any). In existing systems, upon joining a network, an EVPN router publishes an advertisement (e.g., a BGP advertisement) that includes information about the device, but the advertisement does not include any information relating to the UMR capability of the device. In the disclosed embodiments, the advertisement uses a modified-format advertisement that includes information about the UMR capability of the joining EVPN router. A specific format for a BGP advertisement that is modified to include UMR information is described below in connection with FIG. 6.

At step 506, the advertisement (e.g., modified BGP advertisement) published by the joining EVPN router is received by a gateway (a UMR originator). The information in the advertisement-which identifies whether the joining EVPN router has UMR capabilities—is then incorporated into the UMR information maintained by the gateway. Since each EVPN router advertises its UMR capabilities when it joins the local EVPN domain, these capabilities are automatically discovered by the gateway as each EVPN router joins the local EVPN domain. The gateway is therefore aware of the UMR capabilities of all the EVPN routers in the local EVPN domain and can generate a route list which is appropriate for these capabilities.

Figure 6:
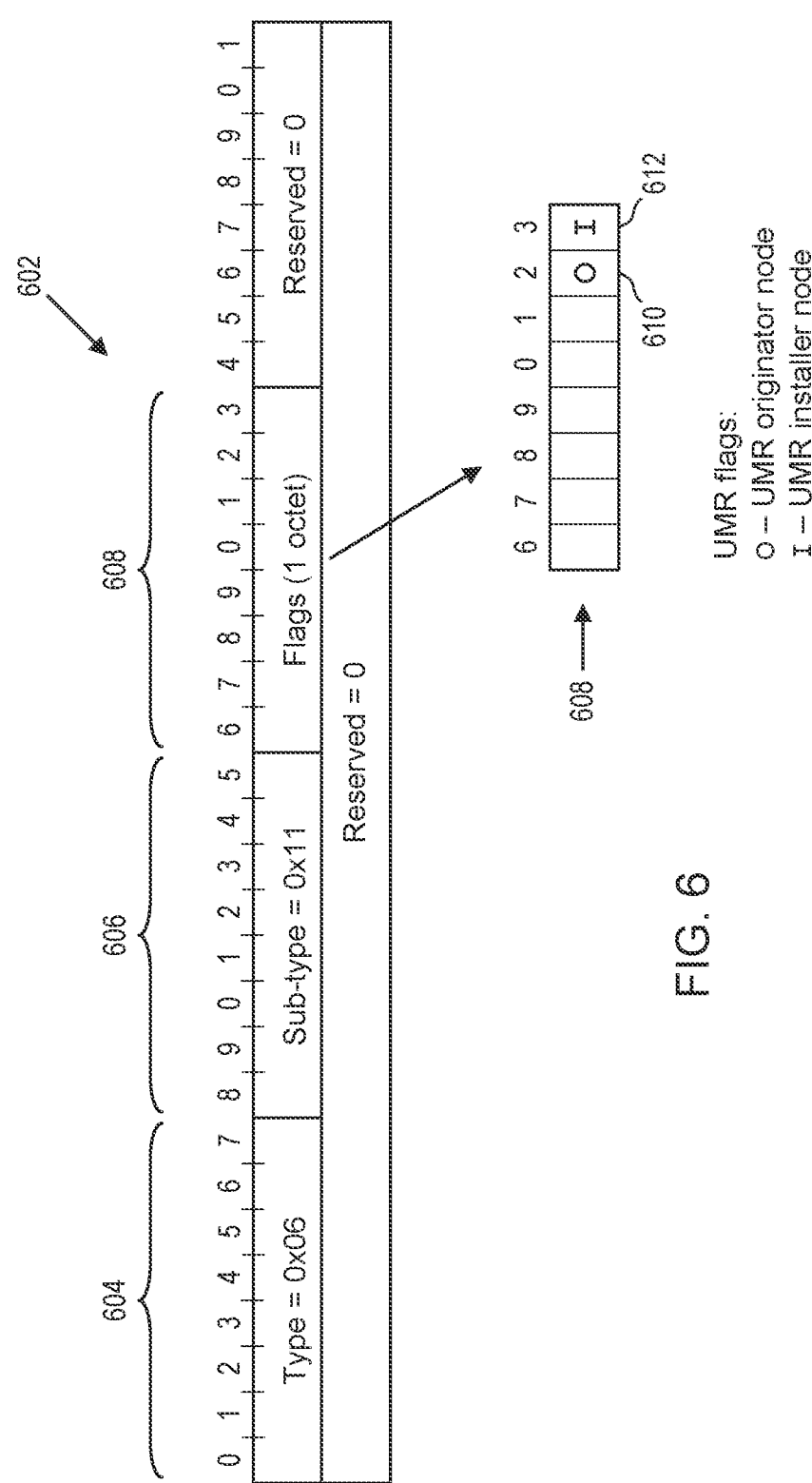
FIG. 6 is a diagram illustrating the format of an EVPN Extended Community attribute for a UMR Role BGP route exchange message in accordance with some embodiments.

Referring to FIG. 6, a diagram is shown to illustrate the format of an EVPN Extended Community attribute for a UMR Role BGP route exchange message in accordance with some embodiments. The new attribute in this message relates to the UMR capabilities of a device.

When BGP is used to advertise a route, this is referred to as the network layer identifier. Inside the advertised route, particular attributes can be identified. These attributes are typically values that are associated with the particular route. In the disclosed embodiments, a new UMR-related attribute called the EVPN UMR extended community can be included in the route. The EVPN UMR extended community attribute identifies whether the EVPN router that is joining the network and is advertising the route is a UMR originator and/or is a UMR installer.

Referring again to FIG. 6, the information identifying the EVPN Extended Community 602 in the modified BGP route exchange message includes 8 bytes (64 bits). The first byte of the attribute is a type field 604 and the second byte is a sub-type 606. The type 604 and sub-type 606 indicate that the attribute is an EVPN Extended Community attribute. The third byte comprises a set of flags 608 for the attribute. In this example, the fourth through eighth bytes are reserved.

In the example of FIG. 6, each bit within byte 608 may comprise a separate flag. Within the set of flags 608, there are two particular bits which serve as flags to indicate the UMR role of the corresponding device. Specifically, bit 22 (the 7th bit in flag byte 608) is a flag 610 indicating whether the device is a UMR originator, and bit 23 (the 8th bit in flag byte 608) is a flag 612 indicating whether the device is a UMR installer.

When an EVPN router joins the network, it uses the BGP route exchange message to advertise whether it is capable of installing a UMR route. The device generates a BGP route exchange message that includes the EVPN Extended Community attribute (type 604=0x06, sub-type 606=0x11), which includes the UMR role flags 608. If the EVPN router is a UMR installer (a node capable of installing the UMR route), the value of flag 612 is set to 1, but if the EVPN router is not a UMR installer, the value of flag 612 is set to 0. Then, when a UMR originator receives the BGP route exchange message, it reads UMR installer flag 612 to determine whether the EVPN router that generated the message is capable of installing a UMR route.

When a UMR originator (e.g., a gateway) proposes to advertise a UMR route, it also uses the BGP route exchange message that includes the EVPN Extended Community attribute (type 604=0x06, sub-type 606=0x11). Since it is an originator, the value of UMR originator flag 610 is set to 1.

Referring to FIG. 7, a flow diagram is provided to illustrate a method implemented by a UMR originator such as a gateway in accordance with some embodiments. At step 702, the UMR originator receives information from the EVPN routers in the local EVPN domain indicating their respective UMR capabilities. In some embodiments, this information is received through an automatic discovery process as described above, in which each EVPN router in the network advertises its UMR capabilities when it joins the local EVPN domain.

At step 704, the UMR originator stores the information indicating the UMR capabilities of the EVPN routers in the local EVPN domain. This information may be stored in a database or any suitable data structure. As additional EVPN routers join the local EVPN domain, their UMR capability information is added to the data structure. Likewise, as EVPN routers are removed from the local EVPN domain, the UMR capability data for the removed EVPN routers is removed from the data structure.

At step 706, when it is necessary for the UMR originator to generate a route list for the EVPN routers in the local EVPN domain, the UMR originator examines the stored data structure with the UMR capabilities of the EVPN routers to identify EVPN routers that have UMR installer capability and EVPN routers that do not have UMR installer capability.

At step 708, the UMR originator determines whether all of the EVPN routers in the local EVPN domain are UMR installers. If all of the EVPN routers in the local EVPN domain are UMR installers, the method proceeds to step 710, and a remote domain route list having only a UMR route (no MAC/IP routes) is generated and distributed to all of the EVPN routers in the local EVPN domain. If, at step 708, the UMR originator determines that the EVPN routers are not all UMR installers, the method proceeds to step 712.

At step 712, the UMR originator determines whether none of the EVPN routers in the local EVPN domain are UMR installers (i.e., all of the EVPN routers are legacy devices). If none of the EVPN routers in the local EVPN domain are UMR installers, the method proceeds to step 714, and a route list having MAC/IP routes for all of the EVPN routers is generated and distributed to all of the EVPN routers in the local EVPN domain. The distributed route list contains no UMR routes. If, at step 712, the UMR originator determines that the EVPN routers are not all legacy devices, the method proceeds to step 716.

At step 716, because the EVPN routers in the local EVPN domain include both UMR installers and legacy devices, a remote domain route list that includes both a UMR route and MAC/IP routes for all of the remote domain EVPN routers is generated and distributed to all of the EVPN routers in the local EVPN domain.

While embodiments described herein have been described with respect to a limited number of embodiments, those skilled in the art, having the benefit of this detailed description, will appreciate that other embodiments can be devised which do not depart from the scope of embodiments as disclosed herein. Accordingly, the scope of embodiments described herein should be limited only by the attached claims.

One embodiment comprises a method for automated discovery of UMR capabilities of devices in a network (e.g., a bridge domain or a layer 2 (L2) network segment). This method includes a first network device joining a network, the first network device advertising its UMR capability upon joining the network, and the first network device receiving an advertisement of UMR capabilities of one or more additional network devices (e.g., EVPN speakers) that existed in the network at the time the first network device joined the network.

In some embodiments, the advertising of the UMR capability of the first network device comprises advertising whether the first network device has UMR originator and/or installer capabilities. The advertisement of the UMR capabilities of the additional network devices may comprise a BGP communication.

If the first network device has UMR originator capabilities (e.g., if it is a DCI gateway), the method includes maintaining a data structure within the first network device that identifies the UMR capabilities of the additional network devices. If the first network device has UMR originator capabilities, the method includes sending routes from the first network device to the additional network devices, where the routes are determined based on the UMR capabilities of the additional network devices.

If it is determined that all of the additional network devices have UMR installer capabilities, the routes sent to the additional network devices include a UMR route and exclude remote domain MAC-IP routes. If it is determined that none of the additional network devices have UMR installer capabilities, the routes sent to the additional network devices include remote domain MAC-IP routes and exclude a UMR route. If it is determined that at least one of the additional network devices has UMR installer capabilities and at least one of the additional network devices does not have UMR installer capabilities, the routes sent to the additional network devices include both a UMR route and remote domain MAC-IP routes.

An alternative embodiment comprises a network device adapted to use UMR routes. The device comprises a processor and a memory, where the processor is configured to generate a BGP route exchange message containing type and sub-type values identifying the BGP route exchange message as being associated with an EVPN Extended Community. The BGP route exchange message further contains a set of flags that identify UMR capabilities of the network device. The network device then publishes the BGP route exchange message to one or more other devices connected to a network.

In some embodiments, the network device is configured to generate the BGP route exchange message in response to joining the network, wherein generating the BGP route exchange message includes setting one or more bits in the BGP route exchange message corresponding to a UMR originator flag and a UMR installer flag in order to identify the device's UMR capabilities. For instance, if the network device is capable of installing UMR routes, the bits in the BGP route exchange message corresponding to the UMR installer flag are set to values indicating that the network device is a UMR installer.

In some embodiments, the network device is capable of originating UMR routes. The device may then receive BGP route exchange messages from other devices connected to the network and maintain information that identifies UMR capabilities of the other devices. As a UMR originator, the network device is configured to generate a route list and to distribute the route list to the one or more other devices connected to the network, the route list being dependent upon the UMR capabilities of the one or more other devices connected to the network. In response to determining that all of the other devices connected to the network have UMR installer capabilities, the route list includes only a UMR route. In response to determining that none of the other devices connected to the network have UMR installer capabilities, the route list includes only remote domain MAC-IP routes. In response to determining that the additional network devices, that at least one device that has UMR installer capabilities and at least one device that does not have UMR installer capabilities, the route list includes a UMR route and remote domain MAC-IP routes for the other devices connected to the network.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth herein.

What is claimed is:

1. A method for automated discovery of Unknown MAC Route (UMR) capabilities of devices in a network, the method comprising;

joining, by a first network device, a network;

advertising, by the first network device upon joining the network, UMR capability of the first network device, wherein the UMR capability specifies whether the first network device has UMR originator abilities or UMR installer capabilities;

receiving, by the first network device in response to joining the network, an advertisement of UMR capabilities of one or more additional network devices that existed in the network at the time the first network device joined the network, wherein the UMR capabilities specify whether the one or more additional network devices have UMR originator abilities or UMR installer capabilities.

2. The method of claim 1, wherein the advertising the UMR capability of the first network device comprises advertising whether the first network device has UMR originator capabilities and advertising whether the first network device has UMR installer capabilities.

3. The method of claim 2, further comprising, if the first network device has UMR originator capabilities, maintaining within the first network device a data structure identifying the UMR capabilities of the one or more additional network devices.

4. The method of claim 3, further comprising, if the first network device has UMR originator capabilities, sending routes from the first network device to the one or more additional network devices, wherein the routes are determined based on the UMR capabilities of the one or more additional network devices.

5. The method of claim 4, wherein in response to determining that all of the one or more additional network devices have UMR installer capabilities, the routes sent to the one or more additional network devices include a UMR route and exclude remote domain MAC-IP routes.

6. The method of claim 4, wherein in response to determining that none of the one or more additional network devices have UMR installer capabilities, the routes sent to the one or more additional network devices include remote domain MAC-IP routes and exclude a UMR route.

7. The method of claim 4, wherein in response to determining that at least one of the one or more additional network devices has UMR installer capabilities and at least one of the one or more additional network devices does not have UMR installer capabilities, the routes sent to the one or more additional network devices include both a UMR route and one or more remote domain MAC-IP routes.

8. The method of claim 1, wherein the first network device comprises a Data Center Interconnect (DCI) gateway.

9. The method of claim 8, wherein the one or more additional network devices comprise leaf Ethernet Virtual Private Network (EVPN) speakers.

10. The method of claim 1, wherein the advertisement of the UMR capabilities of the one or more additional network devices comprises a Border Gateway Protocol (BGP) communication.

11. The method of claim 1, wherein the network comprises a bridge domain.

12. The method of claim 1, wherein the network comprises a layer 2 (L2) network segment.

13. A network device adapted to use Unknown MAC Routes (UMRs) in a network, the network device comprising;

a processor configured to:

generate a Border Gateway Protocol (BGP) route exchange message containing type and sub-type values identifying the BGP route exchange message as being associated with an Ethernet Virtual Private Network (EVPN) Extended Community, the BGP route exchange message further containing a set of flags that identify UMR capabilities of the network device, wherein the UMR capabilities specify whether the network device has UMR originator abilities or UMR installer capabilities; and publish the BGP route exchange message to one or more other devices connected to a network.

14. The network device of claim 13, wherein the network device is capable of originating UMR routes, the network device receiving BGP route exchange messages from one or more other devices connected to the network and maintaining information that identifies UMR capabilities of the one or more other devices connected to the network.

15. The network device of claim 14, wherein the network device is configured to generate a route list and to distribute the route list to the one or more other devices connected to the network, the route list being dependent upon the UMR capabilities of the one or more other devices connected to the network.

16. The network device of claim 15, wherein the network device is configured to, in response to determining that all of the one or more other devices connected to the network have UMR installer capabilities, include a UMR route in the route list and exclude remote domain MAC-IP routes from the route list.

17. The network device of claim 15, wherein the network device is configured to, in response to determining that none of the one or more other devices connected to the network have UMR installer capabilities, include only remote domain MAC-IP routes in the route list and exclude a UMR route from the route list.

18. The network device of claim 15, wherein the network device is configured to, in response to determining that at least one of the one or more other devices connected to the network has UMR installer capabilities and at least one of the one or more devices connected to the network does not have UMR installer capabilities, include a UMR route and remote domain MAC-IP routes for the one or more other devices connected to the network in the route list.

19. The network device of claim 13, wherein the network device is configured to generate the BGP route exchange message in response to joining the network, wherein generating the BGP route exchange message includes setting one or more bits in the BGP route exchange message corresponding to a UMR originator flag and a UMR installer flag.

20. The network device of claim 19, wherein the network device is capable of installing UMR routes, and wherein the one or more bits in the BGP route exchange message corresponding to the UMR installer flag are set to values indicating that the network device is a UMR installer.

* * * * *